United States Patent
Malka et al.

(10) Patent No.: US 6,356,858 B1
(45) Date of Patent: Mar. 12, 2002

(54) COVERAGE MEASUREMENT TOOL FOR USER DEFINED COVERAGE MODELS

(75) Inventors: Yossi Malka, Haifa; Alon Gluska, Adi; Schmuel Ur, Shorashim; Avi Ziv, Haifa, all of (IL)

(73) Assignee: International Business Machines Corp., Armonk, NY (US)

( * ) Notice: Subject to any disclaimer, the term of this patent is extended or adjusted under 35 U.S.C. 154(b) by 0 days.

(21) Appl. No.: 09/249,982

(22) Filed: Feb. 12, 1999

(30) Foreign Application Priority Data

Apr. 3, 1998 (EP) .............................. 98480030

(51) Int. Cl.[7] .............................................. G06F 11/00
(52) U.S. Cl. ............................... 702/186; 716/4; 716/5; 703/13
(58) Field of Search .............................. 702/186; 716/4, 716/5; 703/6, 13, 21, 22; 714/718, 30

(56) References Cited

U.S. PATENT DOCUMENTS 5,724,504 A * 3/1998 Aharon et al. ............ 716/4
6,141,630 A * 10/2000 McNamara et al. ......... 716/4

OTHER PUBLICATIONS

Grinwald et al., User defined coverage—a tool supported methodology for design verification, Jun. 1998, IEEE, pp. 158–163.*

* cited by examiner

*Primary Examiner*—Marc S. Hoff
*Assistant Examiner*—Hien Vo
(74) *Attorney, Agent, or Firm*—Louis J. Percello; Fitch, Even, Tabin & Flannery

(57) ABSTRACT

Coverage measurement tool enabling a user to create a specific coverage tool for a coverage model including a set of coverage tasks specified by the user for checking a design such as a hardware or software system, and being associated with a database and model definition that defines the coverage model. The tool includes an insertion engine for storing into the database a table containing traces resulting from multiple tests, a processing engine processing the traces in the database according to the model definition, and a coverage analyzer analyzing the measurement results from the processing engine and preparing coverage analysis reports according to the model definition.

18 Claims, 5 Drawing Sheets

FIG. 3

| Attribute | Description | Values |
|---|---|---|
| a1 | Stage of 1st branch | 0-9 |
| a2 | Prediction of 1st branch | 0-1 |
| b1 | Stage of 2nd branch | 0-8 |
| b2 | Prediction of 2nd branch | 0-1 |
| c1 | Stage of 3rd branch | 0-7 |
| c2 | Prediction of 3rd branch | 0-1 |
| d1 | Stage of 4th branch | 0-5 |
| d2 | Prediction of 4th branch | 0-1 |
| e1 | Stage of 5th branch | 0-4 |
| f1 | Stage of 6th branch | 0-4 |
| g1 | Stage of 7th branch | 0-2 |
| field 13 | Reset type | 0-2 |
FIG. 4
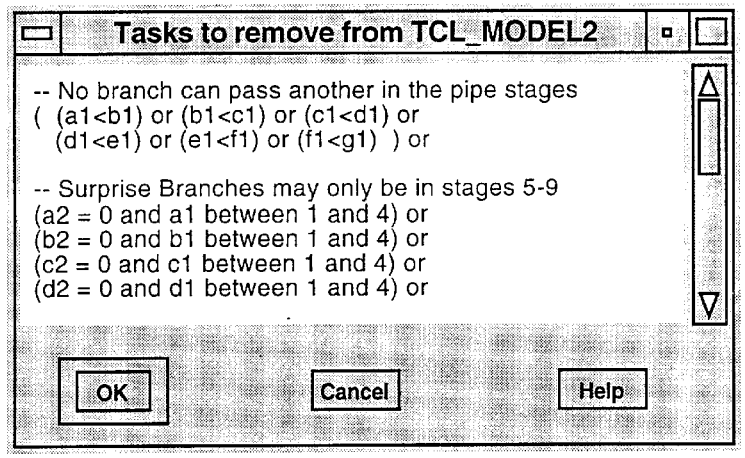
FIG. 5
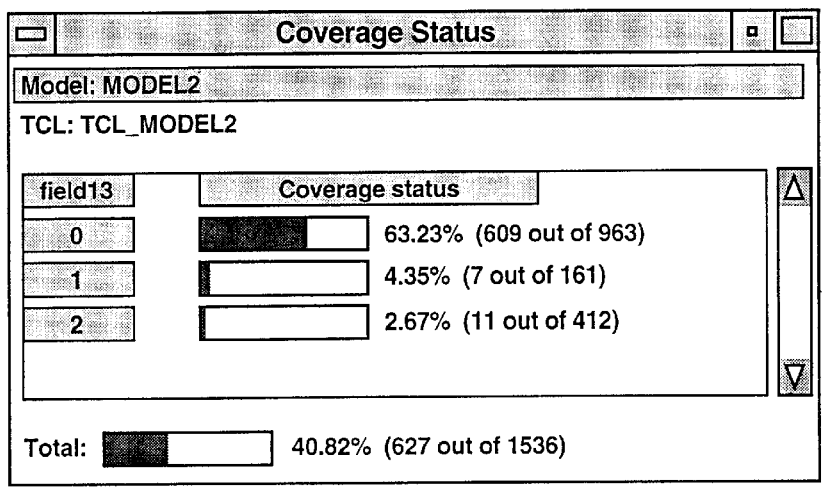
FIG. 7

COVERAGE MEASUREMENT TOOL FOR USER DEFINED COVERAGE MODELS

TECHNICAL FIELD

The present invention relates to coverage tools which are used for both verification in the execution of programs and verification in the operation of a hardware system, and relates particularly to a coverage measurement tool enabling a user to create a solution for coverage models of his choice.

BACKGROUND

Verification is becoming one of the biggest problems of the software industry. The cost of verification as part of the development process is usually between 40–80%. The practice of letting the users find the bugs and fixing them is in the next release is becoming dangerous and costly for three main reasons. The first one is that the users expect the program to work correctly and if it does not, then, there is a cost to the reputation. The second one which is the actual cost of fixing the software could be very large when there is a large install base. The third one is that litigation can be used if the software error caused harm to the user. In software development, it will soon be required of a development to demonstrate that his product was tested adequately.

Functional verification comprises a large portion of the effort in designing a processor. The investment in expert time and computer resources is huge, and so is the cost of delivering faulty products. In current industrial practice, most of the verification is done by generating a massive amount of tests by random test generators. The use of advanced random test generators can increase the quality of the generated tests, but it cannot detect cases in which some areas of the design are not being tested, while other parts are tested repeatedly.

The main technique for checking and showing that the testing has been thorough is called test coverage analysis. Simply stated, the idea is to create, in some systematic fashion, a large and comprehensive list of tasks and check that in the testing phase, each task was covered. Coverage can help in monitoring the quality of testing, and assist in directing the test generators to create tests that hit areas that have not been tested before.

Many coverage tools exist in the market. Most coverage tools are program-based and check code coverage of the execution of programs. Examples include code coverage in C or VHDL and covering states and transitions of state machines. The main disadvantage of code coverage is that it does not <<understand>> the application domain. Therefore, it is very hard to tune the tools to areas which the user thinks are of significance. To overcome this problem, some domain dependent tools have been developed which measure specific functional events. In all these tools the coverage models are hard-coded.

Therefore, in order to make the tools applicable to many users, the models that are implemented in these tools are generic. This leaves a user that wants to cover models that are specific to his design with two options: to measure coverage manually, or to build his own coverage tool for these models. Both options require a large effort and are error prone. Therefore, specific models are rarely used.

SUMMARY OF THE INVENTION

Accordingly, the main object of the invention is to propose a new methodology for coverage of a design calling for separation of the coverage model from the coverage measurement tool.

Another object of the invention is to provide a single general purpose tool meeting all the coverage needs of a user both for generic and specific models.

Another object of the invention is to generate and implement a single general purpose tool which is oblivious to the coverage model and provide all the functionality of existing tools.

Yet another object of the invention is to provide a coverage measurement tool enabling a user to define its own coverage model, gather and process traces to measure the coverage of this model and generate reports on the results of the measurement.

The invention relates therefore to a coverage measurement tool enabling a user to create a specific coverage tool for a coverage model consisting of a set of coverage tasks specified by the user for checking a design such as a hardware or software system, the tool being associated with a database and with model definition means providing a model definition which defines the coverage model. Such a tool comprises an insertion engine for storing into the database a table containing the traces resulting from a plurality of tests, a processing engine for processing the traces stored in the database according to the model definition, and a coverage analyzer for analyzing the measurement results from the processing engine and preparing coverage analysis reports according to the model definition.

According to another aspect, the invention relates also to a method of generating a coverage measurement tool enabling a user to define its own coverage model consisting of a set of coverage tasks meeting certain conditions on the events that create the tasks for checking a design such as a hardware or software system, and comprising the steps of collecting event data from tests performed on the design and inserting the event data into an event trace, extracting from the event trace the tasks meeting the conditions in order to produce a trace task list and determining whether each task of this list is a legal task in order to update a list of the legal tasks when the task is a legal task or to put it into an illegal list when the task is an illegal task.

The advantages of such a coverage measurement tool are enormous. First, it allows the users to define their own models, according to their specific needs, and still enjoy all the functionality of a dedicated coverage tool without the need to develop such a tool. Therefore, it provides users with the means to measure coverage on models which were not available to them before. This tool also allows organizations to use a single tool for most of their coverage needs, and not be forced to buy and maintain a set of tools, one for each coverage model. Another advantage of using an external model definition is that it enables sharing of coverage models between projects. Finally, this tool enables the users to adapt their coverage models to their testing resources, and refine these models during testing. For example, users that can afford only quick and dirty testing can define coarse grain models with a small amount of tasks, while users that want to do comprehensive testing can define finer grain models.

BRIEF DESCRIPTION OF THE FIGURES

The objects, features and other characteristics of the invention will be more readily understood in conjunction with the accompanying drawings in which:

FIG. 3 is a window displayed by the system showing the selection of the attributes in the IIwI model and the WHERE clause of the SQL query defining the conditions to be met by the attributes;

FIG. 4 is a list of the attributes used in the branch unit pipe model;

FIG. 5 is a window displayed by the system showing the restrictions in the definition of the attributes for the branch unit pipe model;

FIG. 7 is a window displayed by the system showing a coverage status report provided by the coverage measurement tool according to the invention for the branch unit pipe models.

DETAILED DESCRIPTION OF THE INVENTION

Figure 1:
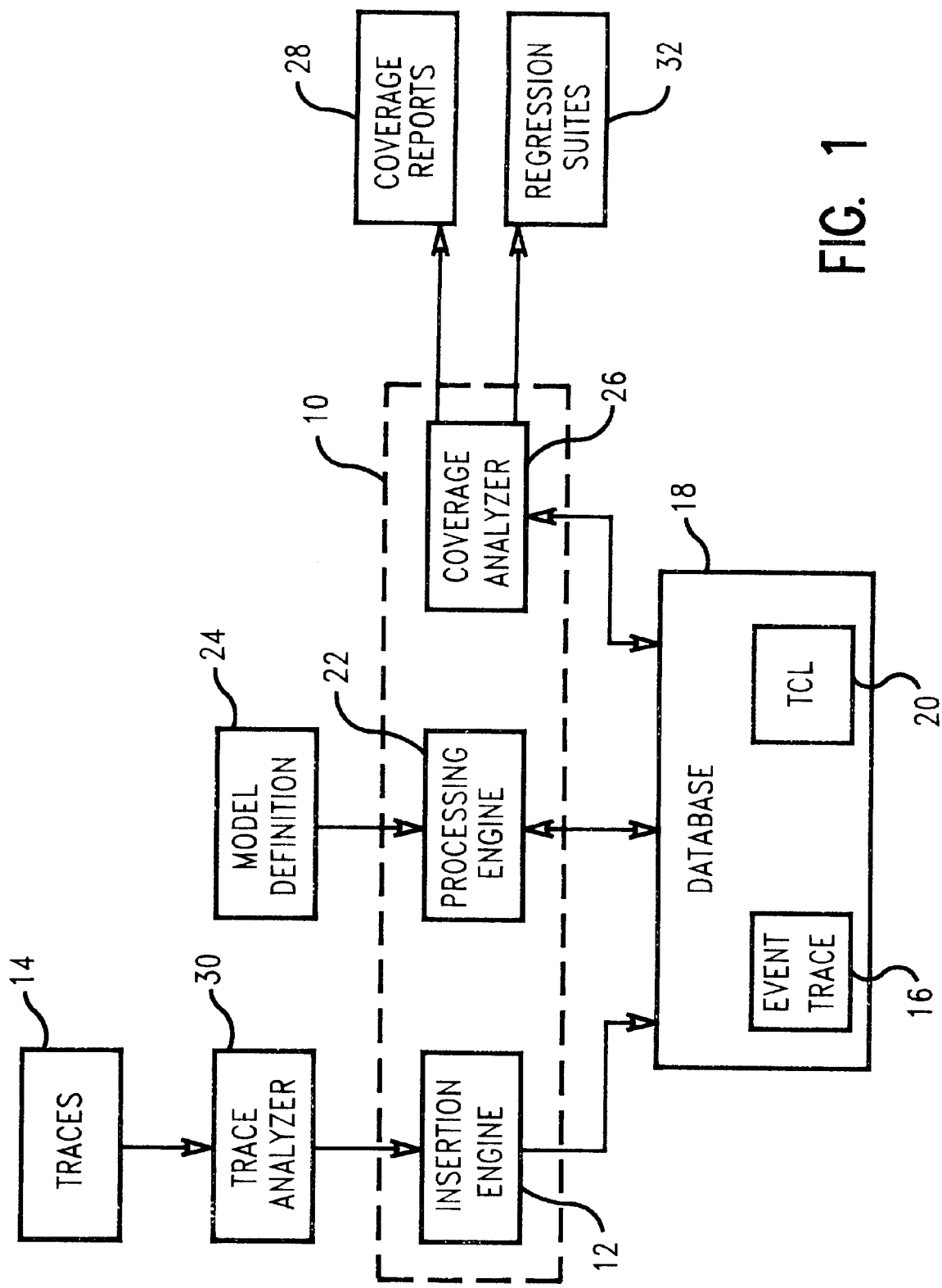
FIG. 1 is a block-diagram of a system incorporating a coverage measurement tool according to the invention.

Generally speaking, coverage can be divided into two types, program-based and functional coverage. Program-based coverage concentrates on measuring syntactic properties in the execution, for example, that each statement was executed, or each transition in a state machine taken. This makes syntactic coverage a generic method which is usually easy to measure. Functional coverage focuses on the functionality of the program, and it is used to check that every aspect of the functionality is tested. Therefore, functional coverage is design and implementation specific, and is much harder to measure. Currently, functional coverage is done mostly manually.

Automation is added to this process in the following way: a coverage task, a binary function on a test or a trace which specifies whether an event occurs or not, is created for each test requirement. Examples of coverage tasks are: <<(statement 534 was executed>>, and <<the instructions in the first two stages of a pipe were add and divide writing to the same target>>. A cohesive group of coverage tasks is called a coverage model.

Coverage tasks can be generalized into coverage models over attributes. Each task is an instantiation of the attributes and the coverage model is the cross product of the possible values. Thus, assuming that the attributes are variables a and b, with:

a=(1, 2)
b=(1, 2, 3)

the list of possible tasks resulting from the cross product of the variable values is then:

| a | b |
|---|---|
| 1 | 1 |
| 1 | 2 |
| 1 | 3 |
| 2 | 1 |
| 2 | 2 |
| 2 | 3 |

Another example of a coverage model over two attributes could be:

First instruction, Second instruction

In such a case, coverage task in this model can be:

ADD, ADD
ADD, DIVIDE
ADD, MULTIPLY

Often, there are restrictions which render illegal some of the coverage tasks defined by the cross product of the attributes. Thus, in the above example with variables a, b, the restriction could be $a \leq b$ which makes the cross product 2, 1 illegal. After such illegal tasks are removed from the list, the remaining list is the task coverage list (TCL) used as explained below.

In order to find out if a coverage task happens in a test, a trace called event trace is created. Rows in the event trace usually contain the values of the attributes at the time the row was produced. Coverage is measured by activating the coverage models on the event trace.

Coverage models are divided into two types: snapshot and temporal. Snapshot models are coverage models whose attributes are taken from a single row in the event trace, for example, the combination of two instructions that are at different stages of a pipe at the same time. Temporal coverage models are coverage models whose attribute are taken from different rows in the even trace. A coverage task in these models is a specific scenario that occurs during the test, for example, the combination of two instructions that were fetched by the processor with a distance of less than 5 cycles between them.

Instead of building his own coverage tool for his model, which requires for the user a large effort, the system of the invention calls for separation of the coverage model from the coverage measurement tool. The idea behind the methodology of the system is that most of the functionality provided by existing coverage tools, such as data gathering and coverage reports, is similar in all tools. The main difference between tools is the models they implement. Therefore, a single general purpose tool, that will be oblivious to the overage model and provide all the functionality of existing tools, can be used to provide all the coverage needs of a user, both for generic and specific models.

A coverage measurement tool according to a preferred embodiment of the invention is illustrated as block 10 in FIG. 1. It consists of three major units which are an insertion engine 12 whose task is to insert events from input traces 14 into an event trace 16 stored in a database 18 in which is also stored TCL 20, a processing engine 22 whose task is to process traces stored in database 18 in order to detect coverage tasks according to a model definition 24, and a coverage analyzer 26 which analyzes the measurement results and prepares coverage reports 28 according to the user definition.

Further to model definition 22 provided by the user, coverage measurement tool 10 requires to add a trace analyzer 30 that converts the format of input traces 14 to a standard format that the coverage measurement tool can handle.

It must be noted that coverage analyzer 26 is also used to create regression suites 32 which are sets of tests used to check that no new bugs were introduced to the design.

Model Definition

The first and most important step in the coverage process is deciding what to cover or, more precisely, on what coverage models to measure coverage. In order to make coverage successful and use it to influence the verification process, it is important to choose the correct types of coverage models. First, it is important to choose coverage models for areas which the user thinks are of significance. Next, the size of the model should be chosen according to the testing resources. The model size (number of tasks) should not be too large, such that it is impossible to cover the model, given test time and resource constraints.

Figure 2:
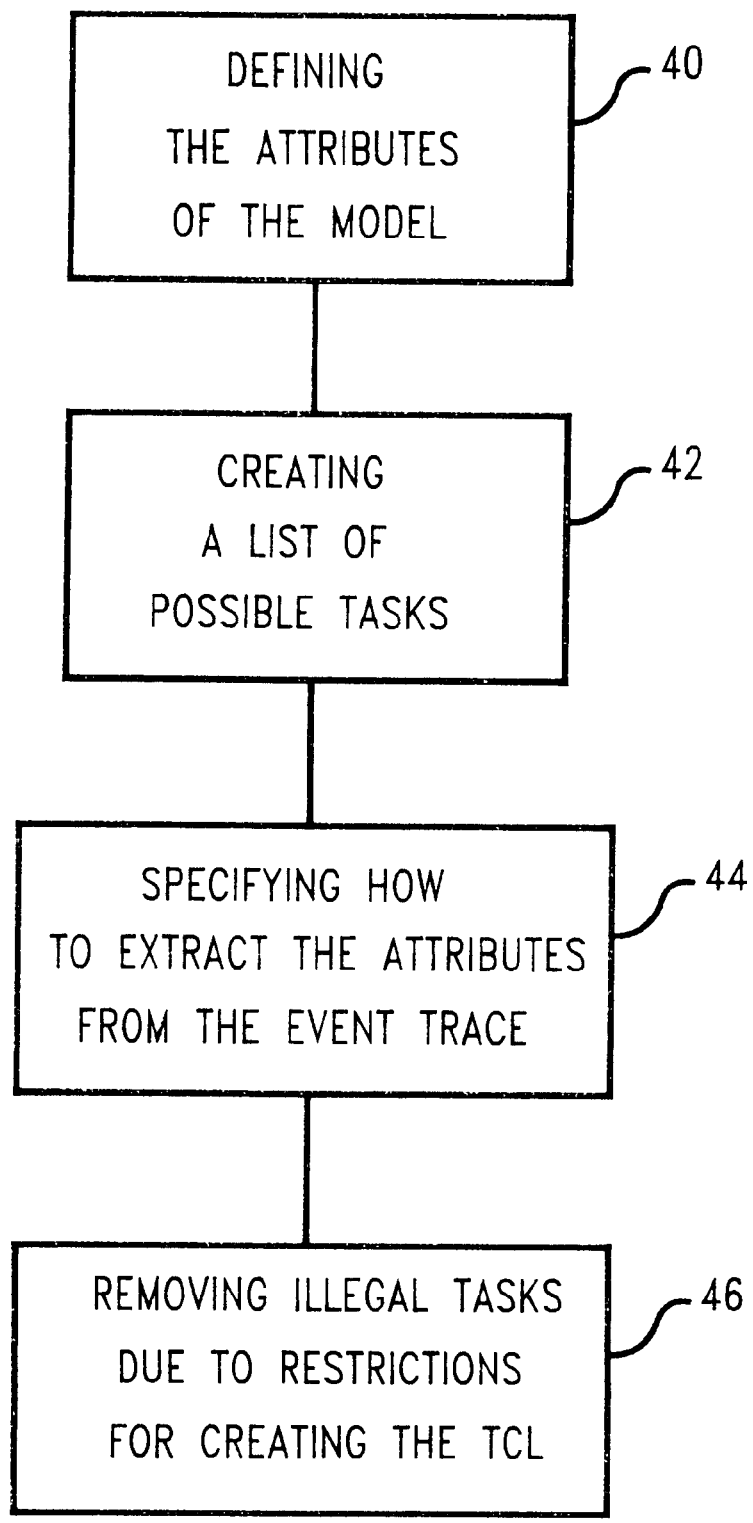
FIG. 2 is a flow-chart of the sequential steps used to create a task coverage list (TCL)

The definition of a coverage model is achieved in several steps represented in FIG. 2. The first step 40 consists in defining the attributes of the model such as variables a, b of the above example and their values. A complete list of possible coverage tasks, step 42, is then created, like the list of all the combinations of the variables when they are given their different values. The third step 44 consists in specifying how to extract the attributes from the event trace. This is generally done by specifying a WHERE clause of an SQL query that defines the conditions of the events that create the tasks. After defining the attributes of the model and its conditions, the last but not the least step 46 is to create the task coverage list (TCL) containing all the legal tasks of the model by removing illegal tasks due to restrictions from the complete list of coverage tasks.

The definition of a model has to be done in a language which is simple enough for a user to use, yet rich enough to describe all the models that the user wants to cover. The experience shows that a language that contains the predicates used in first order temporal logic (and, not, exist, for all, before, after, etc.) combined with the use of simple arithmetic (natural numbers, arithmetic and relational operators), is sufficient.

Note that the language has to be powerful enough as to specify any coverage model that the user requires. This requirement calls for a language as the user might declare complex conditions such as all triples (x, y, z) such that x>y, y>z, z+y>x/2 etc. Another restriction on the language is that it will be possible to translate it automatically into a coverage model. For this reason, the language is first order logic with numerical function.

Two real examples are given herebelow in order to illustrate the model definition as explained above:

1. IIwI Model

The IIwI coverage model was designed as a part of an Architecture Verification Suite (AVS) for PowerPC processors. Since incomplete or wrong cleanup after interrupts is a source of many bugs in processors, it is important to test all possible pairs of instructions with all types of interrupts between them. The IIwI model is an example of a temporal model. The model is defined by a scenario of three events: the first instruction, the second instruction, and an interrupt between the two instructions, with additional constraints on the timing of the events.

Figure 3:
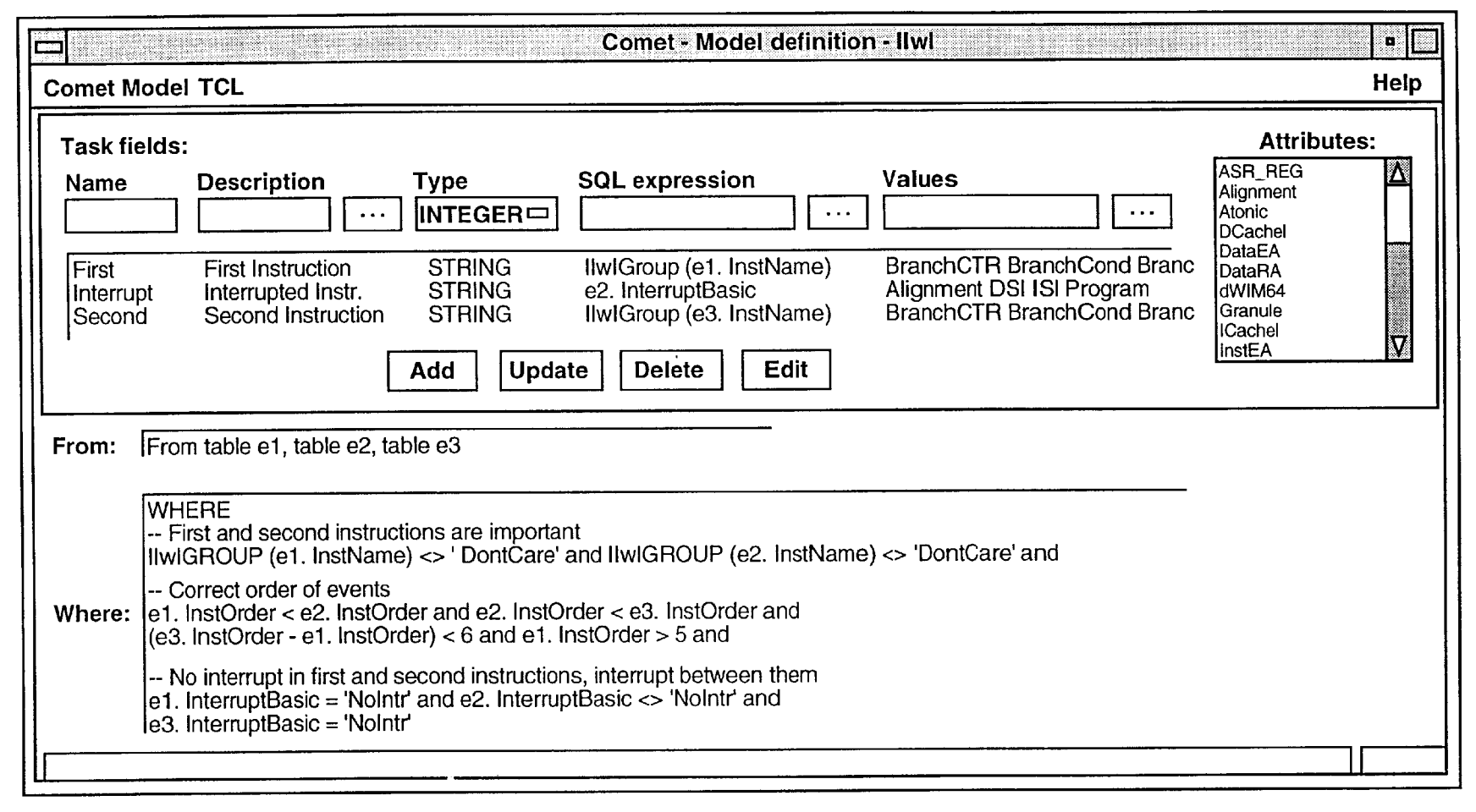

The natural choice for attributes for the model are the instruction name for the first and second instructions, and the interrupt type for the interrupt. The problem with that choice is the size of the model. There are more than 400 PowerPC instructions and 30 types of interrupts, and therefore more than 5 million tasks (400×400×30). Therefore, the instructions have been grouped into 34 groups, each group containing instructions of similar type. The attributes of the IIwI model illustrated in the top part of FIG. 3, are First and Second, which are obtained from the InstName attribute in the trace using the IIwIGroup grouping function, and Interrupt, which is the InterruptBasic attribute, taken directly from the event trace.

The method to extract tasks from the event trace is done by specifying a WHERE clause of an SQL query. Since the IIwI is a temporal model, with tasks consisting of events occurring at three different times, the SQL query involves three views of the event trace, denoted by e1 for the first instruction, e3 for the second one and e2 for the interrupt. The conditions for the IIwI model appear at the bottom of FIG. 3. The conditions are divided into 3 sub-conditions. The first one states the instructions that are of interest (they do not belong to the DontCare group). The second sub-condition deals with the timing of the instructions (the first instruction occurs before the second one with a maximal distance of 6 instructions, and the interrupt is between them). The last sub-condition states that the first and second instructions are not interrupted, while the middle event is an interrupt.

After defining the attributes of the model and its conditions, the last step 46 in FIG. 2 consists in creating the TCL table by removing the illegal tasks defined by restrictions imposed to the attributes. In the present example, the only restriction is that either first and second instruction is not a trap that is an unprogrammed conditional jump to a specified address.

2. Branch Unit Pipe Model

The branch unit pipe model is part of a set of coverage models designed to measure coverage on the branch unit of a processor. This model was designed to check the amount and locations of branch instructions in a nine stage pipe inside the branch unit. The specification of the unit is for a maximum of seven simultaneous branches in the pipe.

The branch unit pipe model is a snapshot model, and its attributes are taken directly from the event trace. The description of the attributes and their values are given in FIG. 4. The attributes describe, for each possible branch in the pipe, the stage it is in and whether it is a predicted or a surprise branch. Another attribute for the model is a reset signal, that can have three values.

Specification of the unit and its environment puts many restrictions on combinations of possible locations and types of branches in the pipe. The restrictions affect which tasks in the model are legal and which are not. Separation between the legal and illegal tasks is done while building the TCL of the model, which is a list of all legal tasks in the model. FIG. 5 shows the window with some restrictions for the branch unit pipe model.

Data Collection

Figure 6:
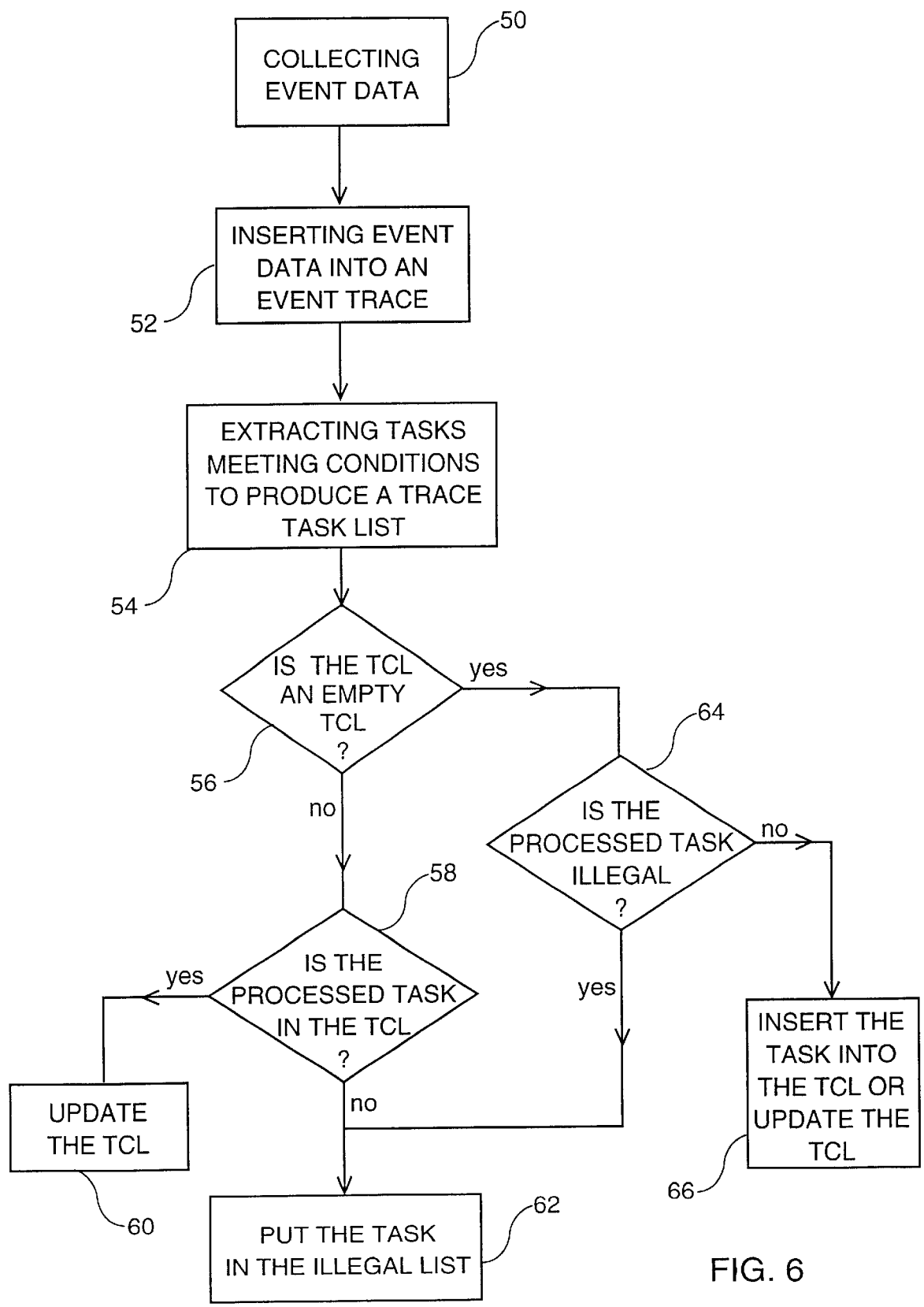
FIG. 6 is a flow-chart of the different steps of the process executed by the processing engine of the coverage measurement tool according to the invention.

In reference to FIG. 6, the next step consists in collecting event data from tests and measure the coverage. The events can come directly from the test programs or from trace files that are created by tracing the behavior or the design during the test. For example, the input for the IIwI model are the instructions and interrupts in the test, which are provided directly by the test generator, while the input for the branch unit pipe model are the stages of instructions in the branch pipe, which are provided by monitoring the pipe during execution of a test.

The decision on which attributes to monitor is taken in parallel with the model definition or even before it, and is affected by the requirements of the model and the ability to monitor the attributes. The exact format of the trace also depends on the environment and mechanisms that are used to generate the test or the trace.

To measure coverage, the traces are inserted at step 52 into a table called EventTrace created in the database. Since the system needs to handle many types of traces, the insertion of data is done in two steps. First, the data are converted to a single format using the Trace Analyzer, and then the formatted data are inserted into the database using the Insertion Engine (see FIG. 1). The Trace Analyzer is specific to each type of trace and should be provided by the user, usually in the form of a simple script.

Trace Processing

After the trace data has been stored in the database, it can be processed by the processing engine. First, the processing engine executes the query of the model on the trace task list, step 54 of FIG. 6, to extract the tasks that occurred in the tests by using the clause of the SQL query defining the conditions of the events that create the tasks. At this moment, there are two possibilities according to whether a TCL has been written or is empty, and is determined at step 56. If there is a non-empty TCL in the database, the next step 58 is to determine whether the task being processed is in the TCL or not by comparing the processed task with the tasks of the TCL. If so, the system updates the TCL by increasing a coverage counter for this task and maintaining other data such as the first and last time this task occurred, at step 60. If not, the task is reported in an illegal task list at step 62.

If the TCL is empty, the process determines, at step 64, whether the task which is in the trace task list is an illegal task. If so, the task is reported in the illegal task list (step 62) as previously. If not, at step 66, the task is inserted into the TCL or the TCL is updated (as in step 60).

It must be noted that, along with any illegal task which is put in the illegal task list, the system notifies the user of detection of the illegal task and stores other information that can help the user to identify the task easily. This information includes the test in which the task was detected, the cycle in which it occurred and the restrictions that the task violates.

Coverage Reports

Analysis of coverage data can provide the user with vital information on the status of the verification process. For example, by looking at a map of covered and uncovered tasks, the user can detect areas that have not been tested. By examining the progress of coverage over time, one can find out when the testing is not producing any new uncovered tasks. We can also see the effects of changes in the testing strategy on the progress of coverage.

The system provides several analysis and reporting mechanisms to the user. The most basic one is the examination of the coverage map in a specific cross section, for example, the coverage of a single attribute. FIG. 7 shows the coverage of the field attribute of the branch unit pipe model. The figure shows that the coverage when field is 0 is high (more than 60% of the legal tasks with this value are covered), while the coverage for the other two values is very low.

This type of coverage analysis can be used to improve the quality of testing by directing the test generator to generate tests that will reach tasks that are not currently covered. It can also assist the designer in finding new restriction, which were overlooked previously, and thus, get better understanding of the design and the environment.

Another type of report that the system can generate is the progress in coverage as a function of time (measured either by testing days, testing cycles, or the number of tests). This type of report can help detect the effects of changes in the testing strategy on the progress of coverage and the time when testing stops being effective since it is not reaching new tasks.

The system can generate other types of reports, such as a list of uncovered tasks, tasks that were covered more than a minimal number of times, and the number and list of new tasks that were covered between certain dates.

Regression Suites

Coverage can also be used to find good regression suites. A regression suite is a set of tests that is run periodically or after major changes to the design, to check that no new bugs were introduced to the design. A regression suite must be, on one hand, be economic so that it can be executed many times. On the other hand, a regression suite must be comprehensive, so that it will be likely to discover new bugs. A good example for a compact and comprehensive regression suite is a minimal set of tests that covers all the tasks in a coverage model (or a set of models). It is thus possible to develop a new algorithm for creating small regression suites incrementally on the fly. Such an algorithm can create small regression suites that cover all the tasks that were covered in the past, for example a regression suite of 742 tests for 5 models of microprocessor pipelines containing 9810 tasks out of 500,000 tests used has been created.

While the present invention has been described in terms of preferred embodiments, various alterations and modifications will occur to those skilled in the art without departing from the scope and spirit of the invention. It is intended that the appended claims encompass all such variations and modifications.

We claim:

1. A coverage measurement tool enabling a user to create a specific coverage tool for a coverage model for checking a design such as a hardware or software system, said coverage model consisting of a set of coverage tasks specified by the user, and said tool being associated with a database and with model definition means providing a model definition which defines said coverage model;

said tool comprising:
  an insertion engine for storing into said database a table containing the traces resulting from a plurality of tests,
  a processing engine for processing the traces stored in said database according to said model definition, and
  a coverage analyzer for analyzing the measurement results from said processing engine and preparing coverage analysis reports according to said model definition.

2. A coverage measurement tool according to claim 1, wherein said traces are first converted to a single format before being stored into said database by a trace analyzer specific to the type of said traces.

3. A coverage measurement tool according to claim 1, wherein said coverage analyzer also provides regression suites including each a set of tests that is run periodically or after major changes to said design in order to check that no new bugs were introduced into said design.

4. A coverage measurement tool according to claim 2, wherein said coverage analyzer also provides regression suites including each a set of tests that is run periodically or after major changes to said design in order to check that no new bugs were introduced into said design.

5. A coverage measurement tool according to claim 1, wherein said model definition means comprise:
  definition means for defining the attributes of said coverage model,
  creating means for creating a list of all possible coverage tasks using the defined attributes,
  specifying means for specifying the conditions to be met by the attributes from said traces resulting from the tests performed on said design, and
  removing means for removing illegal tasks due to restrictions imposed to the tasks and creating a task coverage list (TCL) including all the legal tasks of said coverage model.

6. A coverage measurement tool according to claim 2, wherein said model definition means comprise:

definition means for defining the attributes of said coverage model, creating means for creating a list of all possible coverage tasks using the defined attributes, specifying means for specifying the conditions to be met by the attributes from said traces resulting from the tests performed on said design, and removing means for removing illegal tasks due to restrictions imposed to the tasks and creating a task coverage list (TCL) including all the legal tasks of said coverage model.

7. A coverage measurement tool according to claim 4, wherein said model definition means comprise:

definition means for defining the attributes of said coverage model, creating means for creating a list of all possible coverage tasks using the defined attributes, specifying means for specifying the conditions to be met by the attributes from said traces resulting from the tests performed on said design, and removing means for removing illegal tasks due to restrictions imposed to the tasks and creating a task coverage list (TCL) including all the legal tasks of said coverage model.

8. A coverage measurement tool according to claim 5, wherein said model definition means use a language containing predicates used in first order temporal logic such as and, not, exist, for all, before, after, combined with the use of simple arithmetic such as natural numbers, arithmetic and relational operators.

9. A method of generating a coverage measurement tool enabling a user to define its own coverage model for checking a design such as a hardware or software system, said coverage model consisting of a set of coverage tasks meeting certain conditions on the events that create the tasks;

said method comprising the steps of:

collecting event data from tests performed on said design and inserting said event data into an event trace, extracting from said event trace the tasks meeting said conditions in order to produce a trace task list, and determining whether each task of said trace task list is a legal task in order to update a list of the legal tasks when the task is a legal task or to put it into an illegal list when the task is an illegal task.

10. A method according to claim 9, wherein further to putting the illegal task in said illegal list, other information are notified to the user such as the test in which said illegal task was detected, the cycle in which it occurred and the restriction that the task violates.

11. A method according to claim 10, wherein said step of collecting event data consists in storing the events into trace files created by tracing the behavior of said design during the execution of said test.

12. A method according to claim 11, wherein said step of extracting consists in executing an SQL query defining said conditions on the events that create the tasks.

13. A method according to claim 12 wherein a task coverage list (TCL) is previously defined and said step of determining consists in comparing each task of said trace task list with the tasks of said TCL and defining a task as a legal task when said task is included in said TCL.

14. A method according to claim 13, wherein task coverage list (TCL) is defined by the steps of:

defining the attributes of said coverage model, creating a list of possible coverage tasks using the defined attributes, and removing from said list illegal tasks due to restrictions imposed to said possible coverage tasks.

15. A method according to claim 9, wherein said step of collecting event data consists in storing the events into trace files created by tracing the behavior of said design during the execution of said test.

16. A method according to claim 9, wherein said step of extracting consists in executing an SQL query defining said conditions on the events that create the tasks.

17. A method according to claim 16 wherein a task coverage list (TCL) is previously defined and said step of determining consists in comparing each task of said trace task list with the tasks of said TCL and defining a task as a legal task when said task is included in said TCL.

18. A method according to claim 17, wherein task coverage list (TCL) is defined by the steps of:

defining the attributes of said coverage model, creating a list of possible coverage tasks using the defined attributes, and removing from said list illegal tasks due to restrictions imposed to said possible coverage tasks.

* * * * *